Oct. 20, 1953
D. H. CAMPBELL
CRYSTAL OSCILLATOR
Filed Aug. 21, 1950
2,656,467
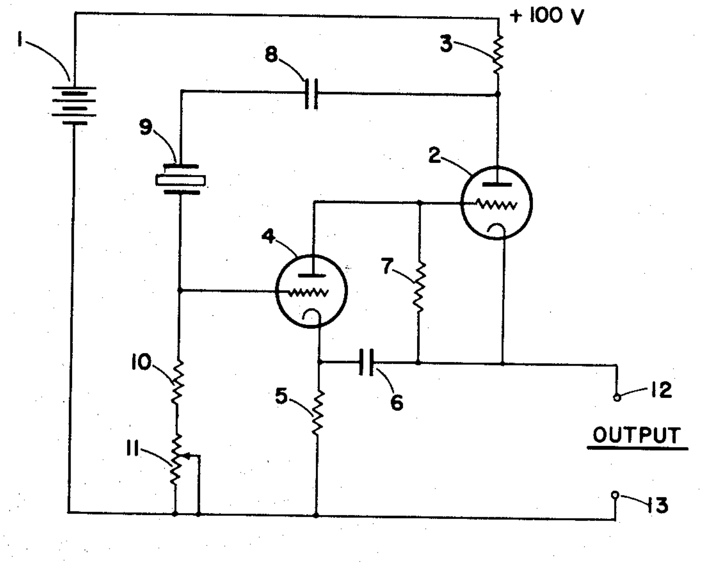
INVENTOR.
DAVID H. CAMPBELL
BY
William R. Lane
ATTORNEY Patented Oct. 20, 1953

UNITED STATES PATENT OFFICE 2,656,467

CRYSTAL OSCILLATOR

David H. Campbell, Norwalk, Calif., assignor to North American Aviation, Inc.

Application August 21, 1950, Serial No. 180,574

5 Claims. (Cl. 250—36)

This invention pertains to means for producing an alternating current wave form of constant frequency, and especially to a crystal oscillator having stable output frequency. One of the principal difficulties experienced with crystal oscillators in the past has been that the tuned circuits associated therewith are temperature sensitive. The oscillator frequency therefore has been caused to vary because of temperature variations. In addition, plate supply voltage has been a factor whose value very often affected the output frequency of crystal oscillators.

It is an object of this invention to provide a crystal oscillator having a stable output frequency.

It is a further object of this invention to provide a crystal oscillator whose frequency essentially does not depend upon the temperature of any of its components other than the crystal itself.

It is another object of this invention to provide a crystal oscillator whose output frequency is substantially entirely dependent upon the characteristics of the crystal itself.

Other objects of invention will become apparent from the following description taken in connection with the single figure in which 1 represents a battery used for the purpose of supplying plate voltage to a triode 2 through a dropping resistance 3. Triode 2 is connected directly by its grid to the plate of triode 4, the cathode of which is connected to ground by resistance 5. A capacitor 6 connects the cathodes of triodes 2 and 4, and a resistance 7 biases the grid of triode 2 from its cathode. A capacitance 8 and piezoelectric crystal 9 connect the grid of triode 4 with the plate of triode 2, and resistances 10 and 11 bias the grid of triode 4. Output frequency of the oscillator is taken from terminals 12 and 13 connected to the cathode of triode 2 and to ground respectively.

In operation the device functions as a relaxation oscillator with separate current paths employed for the charging and discharging respectively of capacitance 6. Assuming for the moment that current flows in triode 4—which assumption requires that capacitance 6 be in charged condition with an excess of electrons on its left-hand plate—the flow of electrons through triode 4 from cathode to plate causes a negative charge on the grid of triode 2, thereby positively preventing conduction of triode 2. As triode 4 continues to conduct, capacitance 6 gradually becomes discharged, thereby decreasing the current through triode 4 and weakening the negative charge on the grid of triode 2. When capacitance 6 has become substantially completely discharged, electrons flow from cathode to plate through triode 2 through resistance 3 to the positive terminal of battery 1 and from the negative terminal of battery 1 through resistance 5 and to the left-hand plate of capacitance 6. The plate of triode 2 receives electrons, thereby dropping its potential so that the right-hand plate of capacitance 8 becomes negatively charged. Since the negative terminal of battery 1 is separated from the grid of triode 4 by relatively small resistance and from the cathode of triode 4 by a resistance it follows that while current is being drawn from battery 1 by triode 2 the grid of triode 4 is negative with respect to its cathode, thereby positively preventing conduction of triode 4 while triode 2 is conducting. Likewise, when triode 2 is conducting, a negative charge is transmitted through capacitance 8 and crystal 9 to the grid of triode 4 to further insure that triode 4 does not conduct while triode 2 is conducting. Thus it is that charging and discharging of capacitance 6 never occurs simultaneously, nor do triodes 2 and 4 conduct simultaneously, but each conducts in alternation with the other so that capacitance 6 is successively charged and discharged. With the circuit values shown, the natural frequency of the relaxation oscillator thus far described is approximately 1 megacycle. In order to assure that the output frequency on terminals 12 and 13 is exactly 1 megacycle, a 1-megacycle quartz crystal 9 is provided, the function of which is to supervise the operation of the oscillator by its influence on the grid of triode 4. Appearing on the plate of triode 2 is an imperfect sine wave form. This wave form is applied through capacitance 8 to crystal 9, which in effect smooths the aforesaid wave form into a sine wave having a 1-megacycle frequency. In addition, crystal 9 presents a high impedance to any frequency other than its natural frequency of 1 megacycle. Any signal frequencies other than 1 megacycle are therefore positively prevented from reaching the grid of triode 4. It has been possible to attain a frequency stability by this invention of one part in ten million, with the crystal temperature controlled over a range not exceeding one-half degree centigrade. Typical circuit values are the following:

| | |
|---|---|
| Battery **1** | 100 volts. |
| Resistance **3** | 7500 ohms. |
| Resistance **5** | 100 ohms. |

| | |
|---|---|
| Capacitance 6 | 500 M. M. F. |
| Resistance 7 | 750 ohms. |
| Capacitance 8 | .01 M. F. |
| Crystal 9 | 1.0 megacycle quartz crystal. |
| Resistance 10 | 250 ohms. |
| Resistance 11 | 100 ohm potentiometer. |

Although the invention has been described and illustrated in detail, it is to be clearly understood that the same is by way of illustration and example only and is not to be taken by way of limitation, the spirit and scope of this invention being limited only by the terms of the appended claims.

I claim:

1. An electronic oscillator comprising a first vacuum tube having a cathode, a plate and a grid; a second vacuum tube having a cathode, a plate and a grid; a capacitance connected between the cathodes of said two tubes; a conductive connection between the plate of said first tube and the grid of said second tube; a piezoelectric crystal and a capacitor connected in series between the plate of said second tube and the grid of said first tube; a source of constant potential electromotive force resistively connected by its positive terminal to the plate of said second tube and resistively connected by its negative terminal to the grid and cathode of said first tube; and a resistance connected between the plate of said first tube and the cathode of said second tube whereby said first vacuum tube tends to discharge said first-named capacitance at a frequency corresponding to the natural frequency of said crystal but is prevented from discharging said capacitance while it is being charged, and said second vacuum tube charges said capacitance only when it is not being discharged by said first vacuum tube to thereby maintain electronic oscillations between the cathode of said second vacuum tube and the negative terminal of said source of electromotive force.

2. An electronic oscillator comprising a capacitance, means including in series with said capacitance a source of direct current, at least one resistance and a vacuum tube having a grid, a plate, and a cathode for charging said capacitance; means including in series a resistance and a second vacuum tube having a cathode, a grid, and a plate connected to opposite sides of said capacitance for discharging said capacitance; a piezoelectric crystal connected between the plate of said first-mentioned vacuum tube and the grid of said second vacuum tube; and a conductive connection between the plate of said second-named vacuum tube and the grid of said first-named vacuum tube whereby said second-named vacuum tube may discharge said capacitance only at the natural frequency of said piezoelectric crystal and when said first-named vacuum tube is not charging said capacitance and said first-named vacuum tube may charge said capacitance only when said second-named vacuum tube is not discharging said capacitance.

3. Means for producing a constant frequency electrical signal comprising a capacitance; means including in series with said capacitance a first vacuum tube having a plate, a cathode, and a grid, at least one resistance and a source of direct current for charging said capacitance; means including in series with said capacitance a resistance and a second vacuum tube having a grid, a plate, and a cathode for discharging said capacitance; a conductive connection between the plate of said second vacuum tube and the grid of said first vacuum tube; and a piezoelectric crystal connected between the plate of said first vacuum tube and the grid of said second vacuum tube to thereby cause said capacitance to be discharged only at the natural frequency of said crystal to prevent discharging said capacitance except when it is not being charged and to prevent charging of said capacitance except when it is not being discharged.

4. Means for generating a constant frequency electrical signal of high stability comprising a capacitance, means for charging said capacitance including in series with said capacitance a resistance, a source of direct current, and a first vacuum tube having a plate, a cathode, and a grid; means for discharging said capacitance including in series with said capacitance a resistance, a second vacuum tube having a grid, a plate, and a cathode; a conductive connection between the plate of said second vacuum tube and the grid of said first vacuum tube; and a piezoelectric crystal connected between the plate of said first vacuum tube and the grid of said second vacuum tube to thereby allow said capacitance to be discharged only at intervals corresponding to the natural frequency of said crystal to prevent discharging of said capacitance except when it is not being charged and to prevent charging of said capacitance except when it is not being discharged.

5. An electronic oscillator of stable frequency comprising a capacitance, a first electronic tube connected to charge said capacitance, a second electronic tube connected to discharge said capacitance, a piezoelectric crystal coupled between the output of said first electronic tube and the input of said second electronic tube to discharge said capacitance at intervals determined by the natural frequency of said crystal, said capacitance being connected between the cathodes of said tubes to prevent simultaneous charging and discharging of said capacitance, a source of electromotive force connected to supply energy losses, and a resistor between the cathode of said second electronic tube and said source of electromotive force, whereby when said first electronic tube conducts during charging of said capacitance, the cathode of said second electronic tube is maintained at a potential which positively prevents discharging said capacitance through said second vacuum tube to maintain electrical oscillations at a stable frequency.

DAVID H. CAMPBELL.

References Cited in the file of this patent

UNITED STATES PATENTS

| Number | Name | Date |
|---|---|---|
| 1,993,783 | Heegner | Mar. 12, 1935 |
| 2,417,286 | Bartels | Mar. 11, 1947 |
| 2,445,933 | Beste | July 27, 1948 |
| 2,577,762 | Hoeppner | Dec. 11, 1951 |